US012143825B2

(12) United States Patent
Reineke et al.

(10) Patent No.: US 12,143,825 B2
(45) Date of Patent: Nov. 12, 2024

(54) METHOD OF SECONDARY DEVICE REAL-TIME UTILIZATION, TRANSIENCE, AND DATA MOVEMENT IN THZ-ENABLED DEVICES

(71) Applicant: EMC IP Holding Company LLC, Hopkinton, MA (US)

(72) Inventors: Nicole Reineke, Northborough, MA (US); Robert A. Lincourt, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 422 days.

(21) Appl. No.: 17/081,662

(22) Filed: Oct. 27, 2020

(65) Prior Publication Data

US 2022/0132302 A1    Apr. 28, 2022

(51) Int. Cl.
  *H04W 12/63*  (2021.01)
  *G06F 8/60*   (2018.01)
  *G06N 20/00*  (2019.01)
  *H04W 12/08*  (2021.01)

(52) U.S. Cl.
  CPC .............. *H04W 12/63* (2021.01); *G06F 8/60* (2013.01); *G06N 20/00* (2019.01); *H04W 12/08* (2013.01)

(58) Field of Classification Search
  CPC ... G06F 21/554; G06F 21/62; H04L 63/0281; H04L 63/10; H04L 63/20; H04W 12/08; H04W 12/63; H04W 12/64
  See application file for complete search history.

(56) References Cited

U.S. PATENT DOCUMENTS

| | | | |
|---|---|---|---|
| 10,373,494 B1* | 8/2019 | Krysiuk | H04W 4/023 |
| 2016/0242143 A1* | 8/2016 | Lotter | H04W 12/08 |
| 2019/0342718 A1* | 11/2019 | Pylappan | H04L 67/565 |
| 2020/0205070 A1* | 6/2020 | Sienkiewicz | H04W 52/0206 |
| 2020/0252838 A1* | 8/2020 | Akdeniz | H04W 36/0061 |
| 2020/0334125 A1* | 10/2020 | Degaonkar | H04L 43/0817 |
| 2022/0075707 A1* | 3/2022 | Degaonkar | G06F 11/3476 |
| 2022/0124570 A1* | 4/2022 | Skarin | H04W 36/32 |
| 2022/0248495 A1* | 8/2022 | Mildh | H04W 76/22 |
| 2022/0345887 A1* | 10/2022 | Karampatsis | H04W 12/069 |

FOREIGN PATENT DOCUMENTS

EP    1401229 A1 *  3/2004  ............ H04W 36/32

OTHER PUBLICATIONS

Kekki et al., "MEC in 5G networks", ETSI White Paper No. 28, pp. 1-28, Jun. 2018 (Year: 2018).*
Singh, Rohit & Lehr, William & Sicker, Douglas & Huq, Kazi. (2019). Beyond 5G: The Role of THz Spectrum.

* cited by examiner

*Primary Examiner* — Luu T Pham
*Assistant Examiner* — Paul J Skwierawski
(74) *Attorney, Agent, or Firm* — Workman Nydegger

(57) ABSTRACT

One example method includes an optimized approach to real-time utilization, data transfer, data storage, and transience in a THz-enabled zone that may be implemented in edge networks, data management, and machine learning. Multiple policies can be enforced based on new sets of attributes such as data type, location, and device movement within a zone or between zones.

18 Claims, 4 Drawing Sheets

METHOD OF SECONDARY DEVICE REAL-TIME UTILIZATION, TRANSIENCE, AND DATA MOVEMENT IN THZ-ENABLED DEVICES

FIELD OF THE INVENTION

Embodiments of the present invention generally relate to networks and network operations. More particularly, at least some embodiments of the invention relate to systems, hardware, software, computer-readable media, and methods for using, transferring data in, and storing data in wireless networks.

BACKGROUND

The capacity of networks, including wireless networks, continues to improve. THz networks, for example, can support wide channels at extremely high data rates. The range of a wireless network, however, may often depend on the environment. The size of the wireless network may be limited by radio range, transmission power, or the locations in which network devices are located. For example, networks in space may be different than networks on the Earth's surface due to the effect of the environment on the transmission of radio waves.

Because of the increased speed and channel widths that are becoming more widely available, there is a need to consider how data and devices can be managed in these networks.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
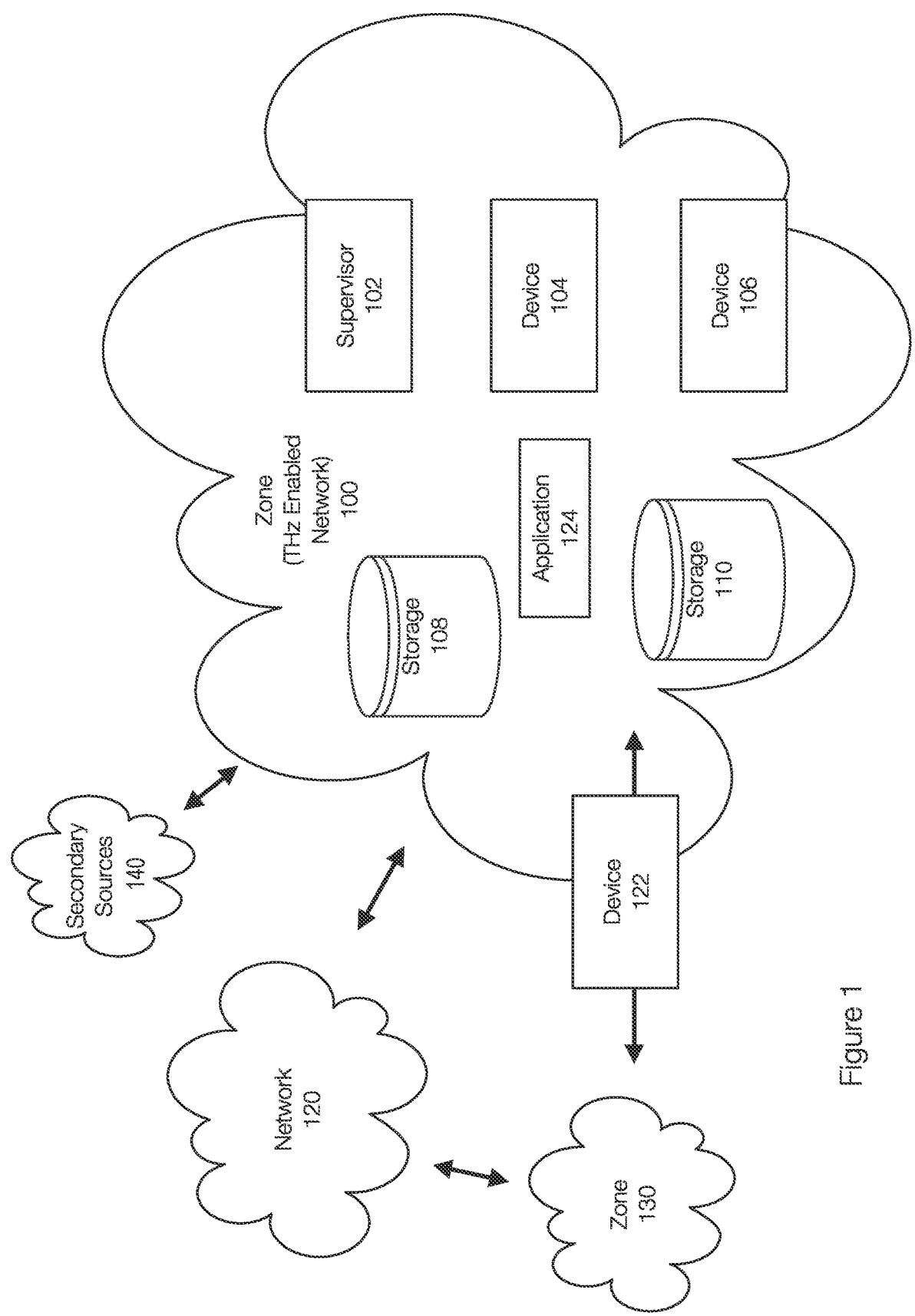
FIG. 1 discloses aspects of a wireless network and illustrates different types of devices operating therein.

Embodiments of the present invention generally relate to networks including wireless networks and management thereof. More particularly, at least some embodiments of the invention relate to systems, hardware, software, computer-readable media, and methods for operations performed in wireless networks such as secondary device utilization and related operations, transience operations, and data movement.

A THz (Terahertz) network operates, as the name suggests, at THZ frequencies. By way of example, these networks may operate at frequencies between 300 gigahertz and 3 terahertz and may also refer to networks above 100 gigahertz. Networks such as mmWave networks may operate at frequencies from 30 gigahertz to 300 gigahertz. Other wireless networks or protocols may include WiFi 6 and enhanced WiFi.

Embodiments of the invention are discussed with reference to THz networks. However, embodiments of the invention are not limited to the wireless networks, frequencies, and protocols discussed herein.

Embodiments of the invention relate to improving and optimizing the real-time utilization of devices and their assets in a THz-enabled network. The utilization of such a network may include data transfer, data storage, device management, device control, and related operations. Embodiments of the invention further relate to various operations including network related operations, data management operations, and artificial intelligence or machine learning related operations.

In the following disclosure, a THz-enabled network or other wireless enabled network may be referred to as a zone. The various objects, storage, computing hardware, or the like that may be connected to a zone or present in a zone may be referred to generally as devices or devices. The devices may be associated with assets. For example, a car may be equipped with computing resources such as a processor, memory, and network hardware. These computing resources may be referred to herein as a device. The object to which the computing resources are mounted or attached may be referred to as the device for convenience. The assets of the device (e.g., a car or its computing resources) may include other devices such as cameras, microphones, and other sensors.

The network speeds available in a zone can drive, by way of example only, near real-time or real-time applications, data collection, data transfer, data storage, device access, and device control. A zone can be configured with multiple policies to be enforced based on attributes such as data type, device type, location, device movement within a zone, device movement into and out of a zone or specified areas (e.g., a datacenter, traffic intersections, airports, stadiums, precincts, or the like) or combination thereof. Zones or portions thereof can be geofenced if desired. Zones can also be extended or scaled.

Some devices are able to move within a zone, from one zone to another zone, or the like. This allows transient devices to carry data from one zone to another zone. These operations may be subject to different levels of protection and usage. The policies and/or attributes can be used to control operations in the network. These can further include various conditions.

A zone allows an interconnected group of devices (e.g., permanent and/or transient devices) to operate together. Embodiments of the invention use the permanence of some devices and the transience of other devices to manage a control plane and/or a data plane. The control plane and the data plane may relate to determining which data paths to use, network topology, and data transmission. Embodiments of the invention further perform deduplication and compression in the zone to reduce overall storage requirements without compromising performance.

In one example, the data transfer speeds in the zone effectively allow the geographically dispersed devices to be treated as a single machine. This allows, by way of example, a computing device which may be remote from a storage device, to read, process, and display data as if the data were stored locally on the computing device. This obviates the need to perform a copy first.

FIG. 1 illustrates an example of a wireless network or a zone. The zone 100 may be a THz enabled network. The zone 100 generally includes a supervisor 102, devices (represented by devices 104, 106, and 122), and storage 108 and 110 (which are also examples of devices). The zone 100 may be configured to communicate with other networks (e.g., other THz enabled networks), such as the zone 130. This communication, however, may be over other networks such as the Internet or using transient devices that are able to move from zone to zone. If sufficiently close or by deploying various devices, the zone 100 and the zone 130 could be combined.

The zone 100 may also be configured to communicate with a network 120, such as the Internet, local/wide area networks (LAN, WAN), cellular networks. In addition, the zone 200 may have access to secondary sources 140 such as GPS (Global Positioning Systems), calendaring systems, maps, cloud-based data, and the like.

The supervisor 102 may be implemented on a device in the zone 100 and may be implemented in a distributed manner. The supervisor 102 is typically configured to manage and/or control the devices, and/or data in the zone 100. The zone 100 may be associated with one or more supervisors.

The devices 104, 106 and 122 operating in the zone may include processors, memory, networking hardware needed to communicate wirelessly in the zone 100, and the like. Other devices may be data sources (e.g., microphones, cameras) and may be associated with some computing resources. As discussed herein, however, embodiments of the invention can access devices or assets such as cameras and microphones without requiring processing at those devices.

The devices 104 and 106 are examples of permanent devices in the zone 100. The device 122 is an example of a transient device that is capable of entering and leaving the zone 100. The devices 104, 106, and 122 may be incorporated into objects in the environment and may be specifically configured for the zone 100. The devices 104 and 106 may be in a local datacenter, an edge cloud, in distributed locations in the zone, or integrated into various structures in the environment. For example, a zone may be created at a stadium and extend at least to the parking areas and encompass areas inside and outside of the stadium. In this case, devices may include computing resources at a command center, devices at various locations including entries, exits, at light poles, and devices at other locations. The zone may include other devices or assets such as video cameras, speakers, microphones, and other sensors distributed in the zone.

Permanent devices, such as the devices 104 and 106, may be semi-static in terms of location. For example, the permanent device 104 may not be attached to a mobile or movable object and generally remains inside the zone 100. The permanent devices 104 and 106 may also be configured in a highly available configuration. The storage 108 and 110 may be arranged in a RAID configuration. This helps the zone 100 to avoid outage or data loss in the event of a failure of a specific device. The permanent devices 104 and 106 may access all available devices in the zone 100. The available devices may be managed by the supervisor 102.

When the transient device 122 enters the network, the supervisor 102 may register the device 122 and ensure that the devices 104 and 106 are aware of and have access to the resources of the device 122. Similarly, the device 122 may have access to the devices already in the zone 100. Further, the supervisor 102 may store characteristics of the device 122 in order to facilitate communications or data transfers in the zone 100. The supervisor 102 may also apply polices to the device 122.

An application 124 may operate in the zone. The application 124 may be associated with the zone specifically or may be configured to operate with multiple zones. When the device 122 is associated with the application (e.g., a police car associated with threat detection software), the application 124 may pre-register the device 122 with the supervisor 102. The application 124 may pre-register the device in other zones as well. Using secondary sources (e.g., calendar, maps, GPS, etc.), the supervisor 102 may be able to predict when the device 122 is about to enter the zone 100. This allows the supervisor 102 to scale up or deploy any resources that the application 124 may need in order to benefit from the device 122 before the device 122 arrives at the network. The supervisor 102 may also simply detect the device 122 upon entry to the network 100 and resources can be scaled up or deployed upon detection.

Figure 2:
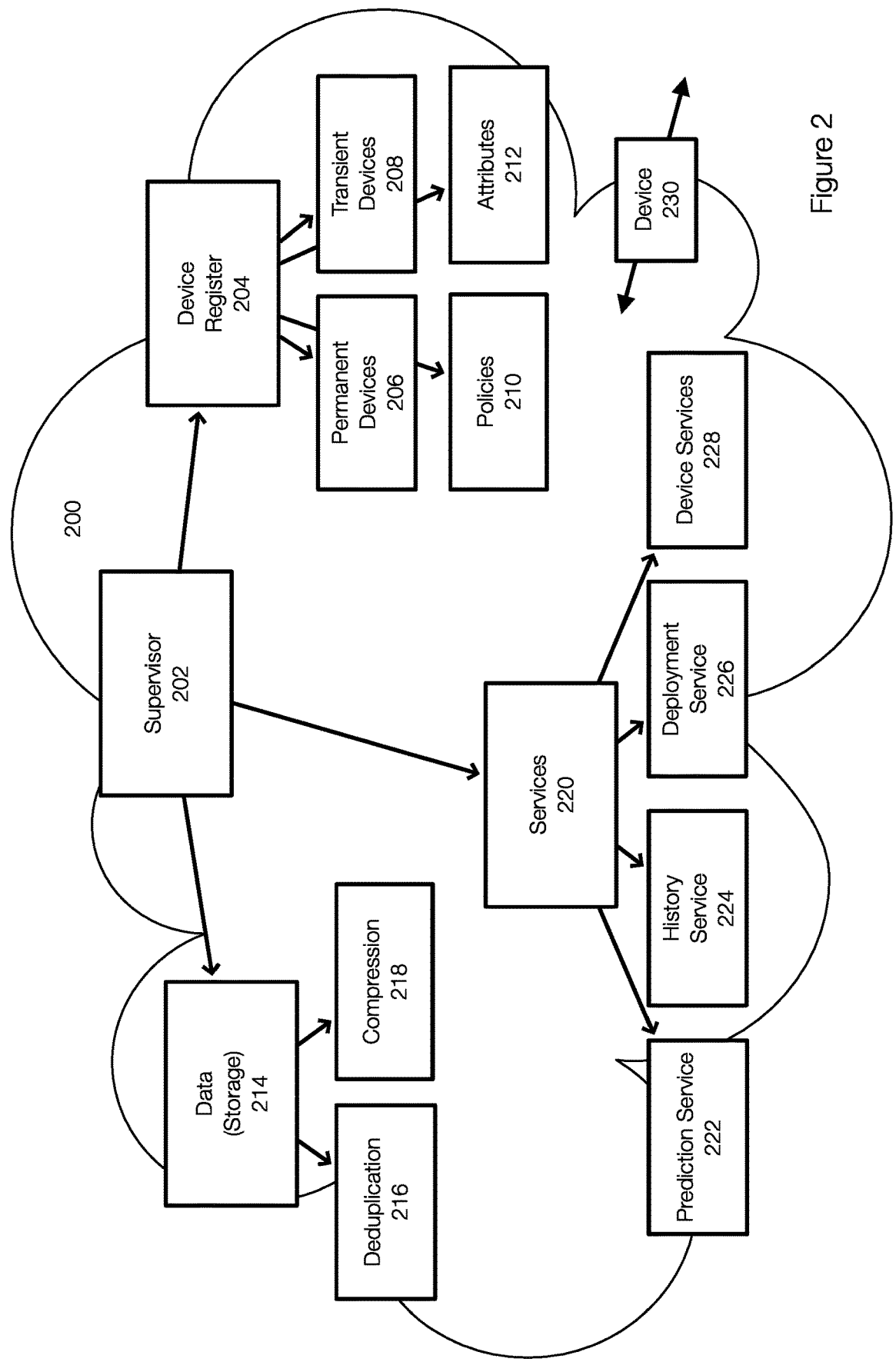
FIG. 2 discloses aspects of wireless network management or control.

FIG. 2 illustrates an example of a supervisor implemented in a zone. The zone may be a THz zone or other wireless zone. In the zone 200, the supervisor 202, which is an example of the supervisor 102, is configured to manage the devices and data, in or associated with the zone 200. The supervisor 202 may be implemented on a device, such as a computing device that includes processors, memory, and the like. The supervisor 202 may also use the resources of other devices in the zone 200 as if the devices were local to the supervisor 202. The high speed and bandwidth of the zone 200 allow geographically distanced devices to be considered as components of the same machine. The supervisor 202 may also manage the ability of devices in the zone 200 to use other devices in the zone 200.

The devices in the zone 200, for example, may only require a small proxy service to facilitate communication. With a device like a server, a proxy service may be a root level shim (or virtualized access point) for the motherboard interface. This would enable access/control of graphic cards, hard drives, SSDs, Wi-Fi and Ethernet hardware connections as if the hardware was local. With regard to IoTs, sensors, or smart city hardware, a software proxy such as a protocol proxy would allow for communication and cross-resource utilization. This allows geographically distanced devices to be treated as if local.

The supervisor 202 manages the devices that are designated as zone accessible. Applications can access the available devices for behaviors or functions such as data access, data storage, streaming, or the like.

In one example, the supervisor 202 may be implemented on at least one of the permanent devices of the zone 200, such as a computing device or server. The supervisor 202 may maintain a device register 204. The device register 204 may store information regarding or maintain registers for permanent devices 206, transient devices 208, policies 210, and/or attributes 212. The device register 204 may also store relationships at least between the devices of the zone and between the devices and the zone itself.

For example, the register of permanent devices 206 identifies all permanent devices that are available in the zone. All permanent devices 206 may have access to all other permanent devices of the zone 200 that are reflected or included in the register of permanent devices 206.

The register of transient devices 208 may be used to track transient devices in the zone 200, such as the transient device 230. When the supervisor 202 detects or predicts that the transient device 230 has entered or is predicted to enter the zone 200, the device 230 is added to the register of transient devices 208 and marked as available for use by another device connected to the zone 200. If resources are required and the needs of the workload support transient devices, the transient devices 208 can be reserved by any device in zone 200. As a result, the transient device 230 becomes an extension of the requesting local hardware. When the transient device 230 leaves the zone, the transient device 230 may be marked as unavailable. The behavior of the transient device 230 may be learned over time. Alternatively, the supervisor 202 may be able to access a calendar system (which may be located outside of the zone 200) to identify the locations of transient devices that may enter the zone 200. An application used for shipping may be able to apprise the zone of devices locations or times when zone access is expected. This allows the supervisor 202 to predict and prepare for the arrival of the transient device 230. Alternatively, the behavior of the transient device 230 may be learned. For example, a truck may follow a prescribed route each day. If that truck is or has a THz enabled device (or device suitable for the network), the supervisor 202 can begin to learn the behavior of the truck. As a result, the availability (e.g., day, time of day, duration, etc.) can be learned or acquired from a secondary source. This allows the supervisor 202 to prepare for the arrival/exit of the transient device 230 relative to the zone 200. In addition, this information may be stored in the register of transient devices 208.

The policies 210 may reflect desired behavior patterns for data types, for transient devices, for permanent devices, and the like or combinations thereof. The policies 210 can be enforced in the zone 200, for example by the supervisor. This enables capabilities for both the zone 200 and the devices themselves. Each device may be associated with one or more policies. For example, a policy may be "from transient device of type x, copy all data to the zone upon entrance and exit of zone". Another example policy may be "from transient device of type y, move data "ABC" to the device that has policy "123" applied. The policies 210 can thus cause data to be downloaded from the transient device 230 or uploaded to the transient device 230 according to policies. For example, trucks that regularly transport certain commodities may be associated with an application. The application may cause inventories, weight, and the like to be downloaded upon entry. The truck may then unload and/or load while in the zone. The same information may be downloaded upon exit.

When the supervisor 202 detects or predicts that a transient device has entered or is about to enter the zone 200, the transient device is added to the register of transient devices 208 or, more generally, to a list of available devices in the zone. This may be achieved by simply changing a flag such as available or not available for the device in the register of transient devices. Some transient devices may be pre-registered with the supervisor 202. The resources and capabilities of the transient device 230 are connected or added to the resources and capabilities of the zone 200 when the transient device is in the zone. This extends the resources and capabilities of the zone 200 at least as long as the transient device 230 is part of the zone 200.

Because the transient device is marked as transient and is marked as such by the supervisor 202, devices or applications that use resources or devices in the zone 200 can plan accordingly. Resource planning can be conducted based on the anticipated availability of the transient device 230. Further, resources pools can be planned for in advance.

Transient devices, once listed as available in the device register 204, are available to be used by any other zone connected device. The transient device, for example, may become an extension of local hardware of other devices in the zone 200.

In one example, some transient devices may have certain access requirements and this information may also be present in the device register 204 or may be acquired from the device by the supervisor. For example, the transient device 230 may provide a single stream access to an asset. When in use, the register 204 may reflect that the stream is in use by a device in the network. The transient device 230 may enable observer access. For example, a video camera of the transient device may enable multiple access points with no modification capabilities. The entries in the device register 204 (or in the transient devices 208) for that device may be marked as in use but available and enable a prescribed number of mounts for active use. Data gathered on or from the devices may be used or processed in real-time in the zone 200. For example, a central processor can access video from a transient device and process the video.

The supervisor 202 may identify the characteristics of the transient device 230. If the transient device 230 is set to enable local data copy to a permanent device, the data may be copied based on the characteristics. For example, the supervisor 202 may determine data types and size and may assign secondary streams of access between one or more permanent devices in the zone 200. Similarly, the transient device 230 may have a policy to copy data (e.g., all data in the zone or a subset of the data) from storage in the zone 200 to the device 230. In this example, the characteristics may be evaluated such as data type, data size and the like.

Once data has been transferred to the zone 200 and/or to the transient device 230, the supervisor 200 may perform deduplication and compression on a zone basis. This is typically performed after the data is located on a permanent device such that no data is lost during transfer of the data. The device services 228, which may include a permanent device service, performs validation on the devices and/or location to ensure data quiescence. If the transient device has sufficient size and capability, the transient device may include a supervisor for local compression and/or deduplication.

The supervisor 202 is also responsible for or manages the data 214 and or the devices or devices associated therewith. The supervisor 202 may, as previously stated, perform deduplication 216 and compression 218 on the data 214, which may be located on multiple devices within the zone 200. As previously stated, these types of operations can be done on the data in place in one embodiment. The data does not need to be copied to another location for deduplication or compression.

The supervisor 202 may also implement services or applications including a prediction service 222, a history service 224, a deployment service 226 and other device services 228. The prediction service 222 may record information related to transient devices. The prediction service 222 may store or use times of entry/exit of the zone, duration in the zone, direction of travel, route, or the like. The prediction service 222 may also access secondary sources such as GPS, event schedules, calendars, maps, and the like. This allows the prediction service 222 to learn over time and to predict the availability of a transient device. The prediction service 222 may also be trained from these types of telemetry data to predict availability, use, and other characteristics of devices including transient devices. The prediction service can also create a contextual image of the transient devices in the zone 200. The contextual image may reflect duration in the zone, locations in the zone, entry/exit points, and the like.

The prediction service may also use some of the other services 220 to help understand when transient devices may be entering a zone. This allows the workloads and orchestrators within the zone to prepare for these transient devices to be added. When leaving the zone, the prediction service also allows the zone to prepare for the departure of the device. For example, workloads may be removed from these devices prior to the devices exiting the zone. In some instances, the prediction service 222 may also predict when a transient device becomes a permanent device. For example, a transient device may stay for extended periods of time in a zone.

The deployment service 226 may provide scaling services such as on-demand service deployment. The deployment service 226 may be used by applications that anticipate an influx of transient devices. If the number of transient devices increases, the deployment service 226 may spin up additional processing components to handle or process the anticipated data transfers, streams, etc. The deployment service 226 aids the zone with scaling. Permanent devices may be scaled up by the supervisor 202. This accessibility reduces the need for larger infrastructure environments such as local datacenters or cloud hosting options. The deployment service 226 may provide scheduling or orchestration for workloads and devices.

This history service 224 may be configured to store or use historical data to predict the time-to-arrive or likelihood of arrival of a transient device 230, to store information relates to use of the permanent devices, or other information. This allows the supervisor 202 to preemptively map access to devices, both permanent and transient. This is useful, for example, where access is temporary and/lor timing is sensitive. The history service 224 may also capture telemetry data related to behavior of the zone including, for example, resources available at time t. This may be used to aid in other services and in evaluating the resources of the zone.

The device services 228 may include a local transient device service and a permanence device service that allow the lifecycle of devices and devices, including data, to be managed. The transient device service be a catalog like service. The transient device service may include a catalog with metadata related to device moving, recently moved out, or that are actively being used within a zone. This helps identify devices that frequently visit the zone and what type of resources or pools of resources can be used. The system that owns these resources needs to be able to use them when required. For transient devices, there is still a need to operate the device itself. For example, a car that may have compute and memory resources, in addition to being used in the zone, still needs to operate the core services that make the car a car. The transient device service may monitor this aspect of the device such that the resources of the transient devices are not over-utilized.

A permanent device service may also be catalog like. The permanent device service that are used to create the zone may need to be optimized over time (e.g., based on a history). This may ensure that the permanent device can be used in an optimal manner and be included in optimum resource pools.

In general, the services 220 that can be used by the supervisor 202, the devices in the zone 200 and/or applications deployed to the zone.

Embodiments of the invention allow conventional restraints to be overcome. For example, streaming data on or from a device may be isolated due to the physical nature of the device or the inability of the device to be used by other or secondary systems, even when these devices are not used by their primary platform or within the zone. Embodiments of the invention allow these devices to be integrated into a zone. Secondary streams allow the data from such a device to be available to all devices in the zone.

In some networks, data acquisition is often burdened by direct wiring requirements, closed-loop systems for processing, and the like. Embodiments of the invention, which include device and data access, allow a device, or treated as a local extension. As a result, the data can be simply accessed and made available for access. This overcomes the limitations of the device by itself.

Embodiments of the invention enable the efficient use of transient devices, which are configured to be local devices that are accessible by all devices of a zone. This is useful, for example, in situations where the transient devices may stream data. Further, embodiments of the invention eliminate data copy as a precursor to processing for various applications including artificial analysis and image analysis. Plus, the ability to transfer data in a zone may also allow the excess bandwidth to be used to copy data to/from transient devices.

Figure 3:
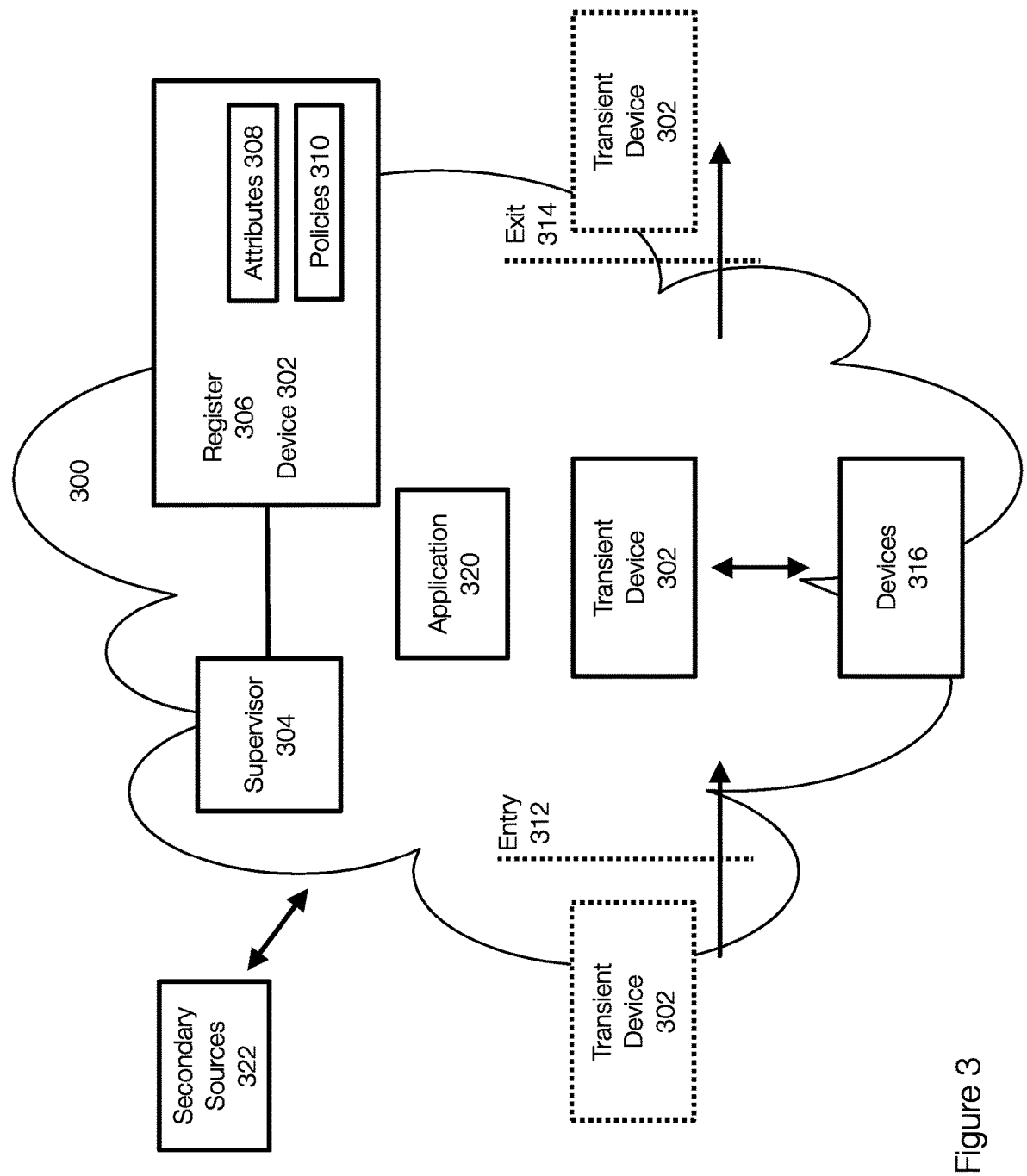
FIG. 3 discloses aspects of managing transient devices in a wireless network.

FIG. 3 illustrates an example of a transient device that may enter and leave a zone. FIG. 3 illustrates a zone 300 that may include devices 316 (e.g., permanent devices). A supervisor 304 is present in the zone 300 and is associated with a register 306. The supervisor 304 may predict that the transient device 302 is about to enter 312 the zone 300. Alternatively, the supervisor 304 may detect when the device 302 enters 312 the zone 300.

The device 302, if this is the first time the device 302 has entered the zone 300, is registered in the register 306 and marked as available upon entry. Policies may be applied to the device 302. The device 302 is marked as unavailable when exiting 314 the zone 314. The register 306 may also include attributes 308 and policies 310 that may be applied to the device 302. The transient device 302 may have been pre-registered, for example by an application deployed in the zone 300.

When the transient device 302 is predicted to enter the zone 300 or when the device 302 enters the zone 300, the supervisor 304 operates to ensure that the device 302 and the device's assets are available to the devices 316. If a history is available or if calendar and route information for the device 302 is determined or has been acquired by the supervisor 304 or the application 320, the supervisor 304 and/or the devices 316 can plan to interact with the device 302 accordingly. For example, if data is to be downloaded from the device 302 to the devices 316 (e.g., to a particular device or storage), the supervisor 304 can prepare for the data based on various characteristics of the data, attributes 308, and/or policies 310. The supervisor 304 may also prepare for any characteristics of the transient device 302 (or its assets) such as single stream access or the like. This allows data transfers (to/from the device 302) to be optimized.

Similarly, the device 302 may be used to receive data from the devices 316 while in the zone. The supervisor 304 can similarly prepare for this type of transaction while accounting for data type, data size, and relevant policies 310 and attributes 308 or the device 302 and/or the policies and attributes or other devices.

For example, physical attributes may include, by way of example only and not limitation, device type (e.g., truck, sensor, plane, satellite), security attributes or policies (e.g., security of the device itself, security of the person in control of the device at a point in time), or timeframe attributes. Timeframe attributes may refer to availability (e.g., when the transient resource is available). The timeframe attributes may also provide conditions. For example, data may be transferred to a device during a certain time period only when the device is bringing a payload to the zone and not transferring a payload out of the zone. In another example, a policy for trucks that are part of a cross-country delivery system includes uploading a set of data to the truck when entering a zone in Boston. If the data is highly sensitive, the policy may be set to ensure that only trucks with drivers who have passed specific security training can receive the data. This could be extended to require that the data is only transferred to a timeframe of the next 12 hours.

The ability to set multiple policies is included in embodiments of the invention. Further, these policies can be based on or use attributes that are specific to the zone and or that have not been previously considered in the context of embodiments of the invention. More specifically, the attributes such as truck type, security attributes, timeframe attributes and the like can be considered in the context of a transient device that is viewed as local hardware for performing various network operations.

Once the device 302 enters the zone 300, the device 302 becomes an extension of the local hardware of the devices 316 due to the network speeds and bandwidth. More generally, the device 302 becomes a device on the zone 300. For some applications, the device 302 (and the devices 316) can be used for processing. An application may deploy a task to the computing resources of the device 302, for example.

In some embodiments, there is no need to copy the data as a precursor to processing the data in some applications because the devices are connected such that they are, in effect, local hardware. Thus, if the device 302 is tasked with processing data, the data does not need to be copied to the device 302 first in some embodiments. This ability to process without copy facilitates compression, deduplication, artificial intelligence and machine learning, and the like.

For example, consider instances of image processing and image recognition. Without embodiments of the invention, to perform processing of real-time video, the processing needs to take place on the edge device so that the video feed can be cached and read at high enough speeds for processing. This problem is evident because the entities that use, for example, traffic cameras, are buying GPUs (Graphics Processing Units) for their traffic cameras. Without the GPU, the images need to be copied to the location in which the image processing and image recognition are being performed.

Embodiments of the invention do not need GPUs on the edge traffic devices. Rather, the video is streamed directly from the device at high enough speeds to keep up with any applications, including artificial intelligence or machine learning, running on a permanent device or even another transient device.

The following examples illustrate an example of the zone 300 and is described with reference to FIG. 3. A public relations firm in a city may installed a zone (e.g., a THz zone) around a baseball park. Thus, the zone 300 corresponds to a baseball park in this example. A protest is scheduled over the use of pine sap during the playoffs. In the city, some vehicles may include devices or equipment that are THz network enabled. Further, these vehicles or their devices have been pre-registered with multiple zones including the zone 300. Thus, the devices or these vehicles are already present in the registry of the zone's supervisor. These devices may have various assets such as video cameras/monitors, sound sensors, and sensor data and metadata.

In addition, the firm has real-time threat analysis software (e.g., the application 320) running in the zone 300. Secondary sources (e.g., calendar of baseball part, GPS) 322, accessible by the supervisor 304 or the application 320, indicate that the protest is scheduled for 11:00 a.m. Using the secondary sources (e.g., GPS data that may be associated with the police vehicles), the supervisor can predict that a zone enabled device 302 (e.g., a police vehicle) is about to enter the zone 300. Further, the supervisor 304 may determine that the device 302, which is a police vehicle, can provide transient services and will be accessible to other devices in the zone.

With regard to the zone 300, permanent devices 316 (and associated assets) may include security sensors building sensors, and a series of high-performance computing assets that enable real-time image and video stream analysis.

When the supervisor 304 detects that the transient device 302 is about to enter the zone, the transient device 302 is added to a list of possible devices to become available. The application 320 may use the deployment services to prepare additional processing services to support the inclusion of new data from the transient device 302 entering the zone 300.

When the transient device 302 enters the zone 300, the threat analysis application 320 immediately accesses assets on the device 302 and begins to process live stream input data or access and process the data generated by those assets. The supervisor 304 may then mark the device 302 as in use (prior attributes or settings may indicate that only one access at a time is permissible on this transient device 302.

The supervisor 304 may determine that the device 302 has a policy of data copy local to permanent device set to on. As a result, secondary data stream copies of all zone enabled device data from the police car are streamed to permanent devices in the zone. The permanent devices receiving the data and the transient device service may perform validation on the data transfer. In case of interruption, transfer may continue from the point of failure.

When the device 302 leaves the zone, the supervisor 304 marks the transient device 302 as inaccessible or unavailable. Using the predictive services, the supervisor 304 may be able to predict when the asset 302 will leave the zone. This allows the supervisor 304 and devices in the zone to prepare for the loss of the device 302. When the threat analysis application 320 is disconnected from the device 302, services may be spun down or released by the deployment services. Access to data that has been copied over from the device 302 is available to all zone connected devices. Data may be deduplicated and/or compressed after copied to the zone. The other police vehicles may be treated similarly.

In another example, it is noted that space exploration and oceanic exploration have challenges with sensor access, data processing and data access. As previously stated, wireless zones including THz zones enable fast data dumps and access capabilities as transient devices come into contact with high performance zones.

For example, shipping is associated with buoys that may be used for slow satellite connections. These buoys can be connected together in a high-speed THz communication path to enable long-distance real-time sensing and data access.

Using secondary sources such as GPS, the GPS location data of the zone and shipping GPS data (including average speed) of a ship can be used to predict that the ship will be in a zone connected to a specific buoy from time Z to time Z+1. This allows the supervisor to spin up and assign resources to perform data transfer at the moment of connection and for the predicted length of connectivity. Data can be downloaded and/or uploaded to the ship while the ship is in the zone.

Figure 4:
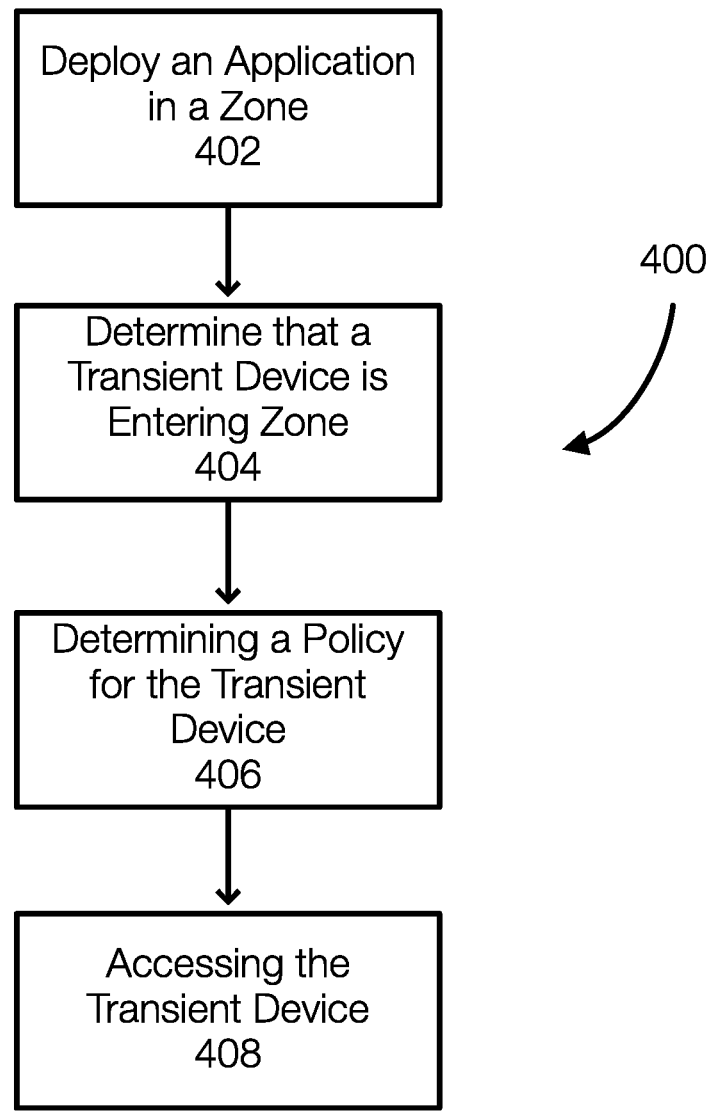
FIG. 4 discloses aspects of a method for managing devices in a wireless network.

FIG. 4 illustrates an example of a method in a zone or a THz enabled zone. In the method 400, an application may be deployed 402. The application can be deployed to a single zone, to multiple zones, or the like. Deploying the application may also include registering transient devices associated with the application with the zone's supervisor. This allows the supervisor, when the transient devices are in the zone or about to enter the zone, to mark the transient devices as available to permanent devices in the zone.

The supervisor of the zone may determine that a transient device has or is about to enter a zone. The supervisor may then perform or invoke various services in the zone. This may be done based, in one example, on requirements of the application. Alternatively, if no application is present, the transient device can be made available to the zone and the computing resources and assets of the transient device are made available to the devices in the zone.

The supervisor, upon determining 404 that the transient device has entered a zone, may also register the transient device if not already registered. This is part of making the transient device available in the zone. Services of the zone, such as deployment (or scaling) services, history services, prediction services, transient device services, and the like may be called and used.

A policy and/or attributes of the transient device may be determined 406 or applied and enforced. If the transient device has a particular policy or particular attributes (e.g., data characteristics, streaming capabilities, processing capability, memory size), the policy can be enforced in the zone.

The transient device is then accessed 408 and used by one or more applications or by needs of the zone. The transient device can be treated as an extension of the zone devices. The speeds and bandwidth of the zone, in addition to allowing use of the device for an application, may also allow data to be downloaded from or uploaded to the device as needed.

Zones and their associated services can also be used in orbital or space exploration as well. The settings of a transient device allow data to be downloaded from the satellite or ship or other device and receive critical data (e.g., weather data, system updates) and sensor devices on the zone to the ship or satellite. Embodiments allow devices in space to transfer data when they encounter a THz enabled zone, such as a space station or the like. Further, devices can be deployed specifically for data upload/download. This may be useful, for example, for sensitive data. Such a zone may be useful in space stations, for example, to ensure that various scenarios (e.g., loss of oxygen, leaks, malfunctions) or the like are detected and handled.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, THZ zone related operations. Such operations may include, but are not limited to, data upload, device access, device control data download, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example methods any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: deploying an application in a zone that includes a network or wireless network, wherein the zone includes permanent devices, determining, by a supervisor operating in the zone, that a transient device is about to or has entered the zone, determining a policy associated with the transient device and enabling the permanent devices to access the transient device in accordance with the policy, and accessing the transient device to download data from the transient device to an least one permanent device or to upload second data to the transient device.

Embodiment 2. The method of embodiment 1, further comprising predicting that the transient device is about to enter the zone using secondary sources including one or more of GPS data, calendar data, map data, or based on machine learning, wherein the machine learning is trained using historical telemetry data associated with the transient asset including zone entry times, zone exit times and zone duration times.

Embodiment 3. The method of embodiment 1 and/or 2, further comprising preparing for the transient asset by scaling up computing resources.

Embodiment 4. The method of embodiment 1, 2, and/or 3, further comprising accessing the transient device as a local extension of permanent devices in the zone.

Embodiment 5. The method of embodiment 1, 2, 3, and/or 4, further comprising registering the transient device in a register maintained by the supervisor and marking the transient device as available when the transient device is in the zone.

Embodiment 6. The method of embodiment 1, 2, 3, 4, and/or 5, further comprising establishing secondary streams in the zone for assets associated with the transient device.

Embodiment 7. The method of embodiment 1, 2, 3, 4, 5, and/or 6, further comprising running a proxy service at each of the permanent devices.

Embodiment 8. The method of embodiment 1, 2, 3, 4, 5, 6, and/or 7, further comprising transporting data from the zone to another zone by the transient device.

Embodiment 9. The method of embodiment 1, 2, 3, 4, 5, 6, 7, and/or 8, further comprising deduplicating data stored in the zone after transfer to/from the transient device is completed.

Embodiment 10. The method of embodiment 1, 2, 3, 4, 5, 6, 7, 8, and/or 9, further comprising performing one or more of a prediction service, a history service, a deployment service, a transient device service, and a permanent device service.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more or portions thereof of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein In one example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
deploying an application in a zone that includes a wireless network, wherein the zone includes permanent devices;
predicting that a transient device is about to enter the zone based on machine learning;
preparing for the transient device by including additional processing services to support data from the transient device;
determining, by a supervisor operating in the zone, that the transient device has entered the zone;
registering the transient device in a register maintained by the supervisor, wherein the supervisor designates the transient device as zone accessible enabling the application to be permitted to access the transient device for functions including data access and data storage;
marking the transient device as available when the transient device is in the zone, wherein the transient device comprises a root level access point enabling computing resources of the transient device to be accessible by the permanent devices as if the computing resources of the transient device are local to the permanent devices for the data access and data storage functions when the transient device is marked as available in the zone;
determining a policy associated with the transient device and enabling the permanent devices to access the transient device in accordance with the policy; and
accessing the transient device to download the data from the transient device to at least one permanent device or to upload second data to the transient device.

2. The method of claim 1, wherein predicting that the transient device is about to enter the zone is further based on using secondary sources including one or more of GPS data, calendar data, map data.

3. The method of claim 1, further comprising preparing for the transient asset by scaling up computing resources.

4. The method of claim 1, wherein the machine learning is trained using historical telemetry data associated with the transient asset including zone entry times, zone exit times and zone duration times.

5. The method of claim 1, further comprising establishing secondary streams in the zone for assets associated with the transient device.

6. The method of claim 1, further comprising running a proxy service at each of the permanent devices.

7. The method of claim 1, wherein the network is a TeraHertz enabled network.

8. The method of claim 1, further comprising deduplicating data stored in the zone after transfer to/from the transient device is completed.

9. The method of claim 1, further comprising performing one or more of a prediction service, a history service, a deployment service, a transient device service, and a permanent device service.

10. A non-transitory storage medium having stored therein instructions that are executable by one or more hardware processors to perform operations comprising:
deploying an application in a zone that includes a wireless network, wherein the zone includes permanent devices;
predicting that a transient device is about to enter the zone based on machine learning;
preparing for the transient device by including additional processing services to support data from the transient device;
determining, by a supervisor operating in the zone, that the transient device has entered the zone;
registering the transient device in a register maintained by the supervisor, wherein the supervisor designates the transient device as zone accessible enabling the application to be permitted to access the transient device for functions including data access and data storage;
marking the transient device as available when the transient device is in the zone, wherein the transient device comprises a root level access point enabling computing resources of the transient device to be accessible by the permanent devices as if the computing resources of the transient device are local to the permanent devices for the data access and data storage functions when the transient device is marked as available in the zone;
determining a policy associated with the transient device and enabling the permanent devices to access the transient device in accordance with the policy; and
accessing the transient device to download the data from the transient device to at least one permanent device or to upload second data to the transient device.

11. The non-transitory storage medium of claim 10, wherein predicting that the transient device is about to enter the zone is further based on using secondary sources including one or more of GPS data, calendar data, map data.

12. The non-transitory storage medium of claim 10, further comprising preparing for the transient asset by scaling up computing resources.

13. The non-transitory storage medium of claim 10, wherein the machine learning is trained using historical telemetry data associated with the transient asset including zone entry times, zone exit times and zone duration times.

14. The non-transitory storage medium of claim 10, further comprising establishing secondary streams in the zone for assets associated with the transient device.

15. The non-transitory storage medium of claim 10, further comprising running a proxy service at each of the permanent devices.

16. The non-transitory storage medium of claim 10, further comprising transporting data from the zone to another zone by the transient device.

17. The non-transitory storage medium of claim 10, further comprising deduplicating data stored in the zone after transfer to/from the transient device is completed.

18. The non-transitory storage medium of claim 10, further comprising performing one or more of a prediction service, a history service, a deployment service, a transient device service, and a permanent device service.

* * * * *